United States Patent [19]

Noble

[11] 4,020,916
[45] May 3, 1977

[54] SELF-PROPELLED SHOPPING CART

[75] Inventor: Roy A. Noble, Springville, Pa.

[73] Assignee: The Raymond Lee Organization, Inc., New York, N.Y. ; a part interest

[22] Filed: Dec. 9, 1975

[21] Appl. No.: 639,211

[52] U.S. Cl. .................... 180/65 R; 180/77 R; 280/87.1

[51] Int. Cl.² ............... B60L 1/18; B60P 3/00

[58] Field of Search ........... 180/65 R, 65 F, 2, 60, 180/77 R; 280/33.99 R, 33.99 C, 87.1

[56] References Cited

UNITED STATES PATENTS

| | | | |
|---|---|---|---|
| 439,395 | 10/1890 | Fleischer | 180/65 R |
| 1,832,018 | 11/1931 | Gossard | 180/65 R X |
| 2,865,223 | 12/1958 | Kope | 280/87.1 X |
| 3,044,801 | 7/1972 | Vicany | 280/33.99 A X |
| 3,117,648 | 1/1964 | Landreth | 180/65 R X |
| 3,190,386 | 6/1965 | Swinny | 280/33.99 A X |
| 3,201,139 | 8/1965 | Turlington | 280/33.99 C |
| 3,524,512 | 8/1970 | Voeks et al. | 280/33.99 R X |
| 3,575,250 | 4/1971 | Dykes | 180/65 R X |

FOREIGN PATENTS OR APPLICATIONS 561,234  5/1944  United Kingdom ............ 180/77 R

*Primary Examiner*—Joseph F. Peters, Jr.
*Assistant Examiner*—Milton L. Smith
*Attorney, Agent, or Firm*—Howard I. Podell

[57] ABSTRACT

A shopping cart for use in supermarket stores that is propelled by a battery driven electric motor. The cart is in the form of a frame supported by four wheels, with an open shopping basket mounted in the forward and intermediate section of the frame and a bench seat mounted over the rear wheels. A foot platform, open at each side, separates the basket from the seat. The cart is controlled by two foot pedals, one of which controls the steering of the wheels under the seat with the other foot pedal controlling the direction of travel and the start and stop of cart travel. A baby seat is hinged inside the shopping basket to a wall of the basket.

1 Claim, 4 Drawing Figures

SELF-PROPELLED SHOPPING CART

SUMMARY OF THE INVENTION

My invention is a shopping cart for use in a store or a shopping mall that is propelled by a battery driven reversible electric motor. The cart is in the form of a frame supported by four wheels, with an open shopping basket mounted in the forward and intermediate section of the frame and a bench seat mounted over the rear wheels. A foot platform, open at each side, separates the basket from the seat. The cart is controlled by two foot pedals, one of which controls the steering of the wheels under the seat with the other foot pedal controlling the direction of travel and the start and stop of cart travel. A baby seat is hinged inside the shopping basket to a wall of the basket.

By means of my invention, a seated shopper may readily control the movement of the cart along the aisles of a store and readily get on and off the cart as necessary. The invention may be similarly employed by a seated shopper to propel the cart into and out of stores in a shopping mall.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
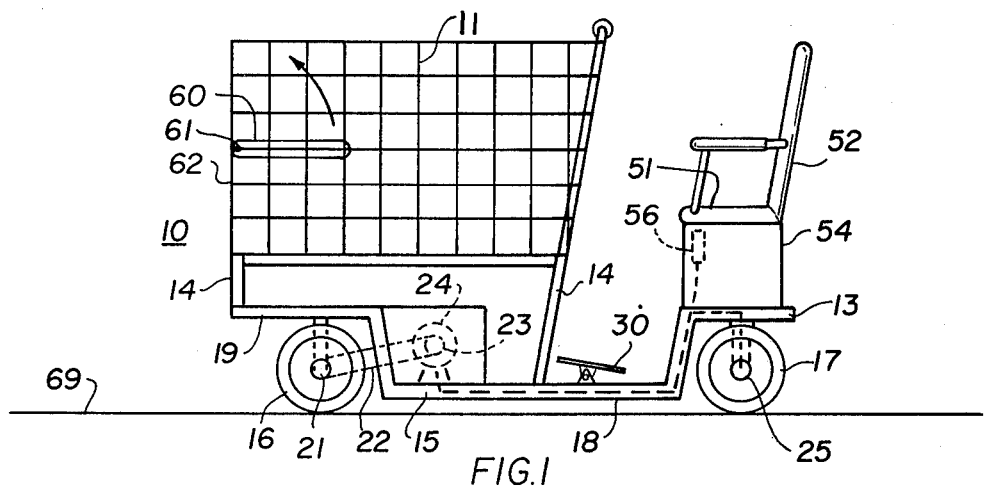
FIG. 1 is a side view of the invention.
Figure 2:
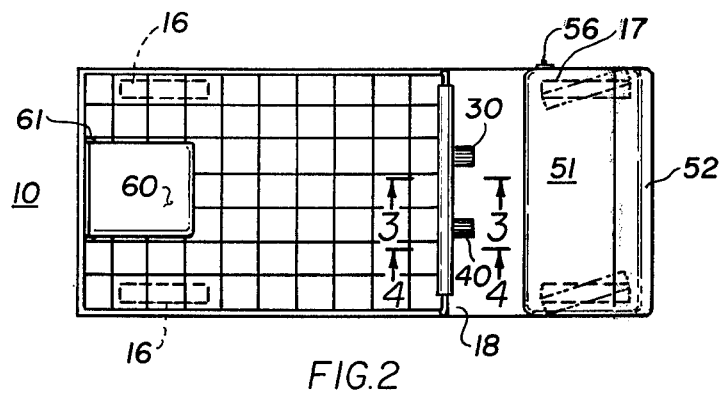
FIG. 2 is a plan view of the invention.
Figure 3:
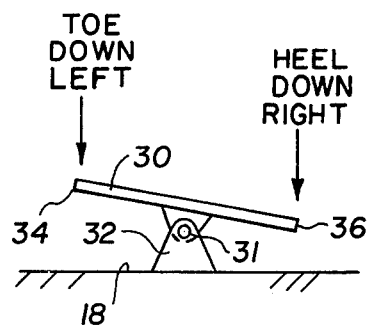
FIG. 3 is a side view of the steering control pedal, taken along line 3—3 of FIG. 2.
Figure 4:
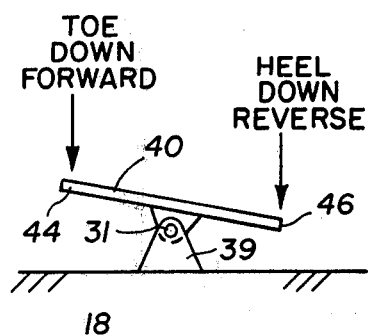
FIG. 4 is a side view of the travel control pedal taken along line 4—4 of FIG. 2.

Turning now descriptively to the drawings, in which similar reference characters denote similar elements throughout the several views, FIGS. 1-4 illustrate the shopping cart 10. An open top wire basket 11 is mounted by supports 14 to a platform 15, with platform 15 mounted to a pair of front wheels 16 and a pair of rear wheels 17. The intermediate section 18 of the platform 15, between wheels 16 and 17 is depressed below the level of the forward section 19 of the platform which is stepped over the front wheels 16 and the rear section 13 of the platform which is stepped over the rear wheels 17. Wheels 16 and 17 are located under the stepped section of platform 15.

Front wheels 16 are fixed to an axle 21 driven by a belt 22 that fits about the drive pulley 23 of a reversible motor 24 mounted under the basket 11 to the platform 15.

Rear wheels 17 are mounted to an axle 25 so as to be steerable by mechanism (not shown) controlled by a first foot pedal 30 mounted on the depressed section 18 of the platform. The steering mechanism linking foot pedal 30 to the rear wheels 17 may be of a completely mechanical nature, or alternately pedal 30 may actuate electrical switches to drive an electrical motor that powers the rear wheel steering mechanism. Pedal 30 is pivotably mounted by a hinge pin 31 to bracket 32 fixed to platform section 18 so as to permit the steering pedal 30 to rotate in the vertical plane. Pressure of a toe of the user against the forward section 34 of the pedal 30, to rotate pedal 30, operates the steering mechanism to steer the rear wheels 17 so as to turn the cart, when moving, to the left. Contrary motion of pedal 30 caused by pressure of the heel of the user against the rear section 36 of pedal 30 causes the cart, when moving, to turn towards the right.

A second foot pedal 40 is similarly mounted by a hinge pin 31 to a bracket 39 fastened to the platform section 18 adjacent to pedal 30, with the second pedal 40 serving the control both motion and direction of travel of the cart 10 in the forward or aft direction. Pedal 40 is linked to switches (not shown) controlling the power circuit of motor 24 such that the motor 24 is in the OFF condition when pedal 40 is in the horizontal plane. Downward movement of the forward section 44 of pedal 40 causes the cart to move forwards under the action of motor 24, with downward movement of the rear section 46 of pedal 40 from the horizontal position causing cart 10 to move in the rearwards direction.

A seat 51, fitted with a backrest 52, is fixed on a chest 54 mounted on the rear section 13 of platform 15, so that the user seated on seat 51 faces the basket 11 and is in a convenient position to operate pedals 30 and 40 with his feet.

A battery (not shown) is located either in chest 54, or adjacent to motor 24 with the power circuit, leading from the battery, controlled by a switch 56 mounted in the exterior chest side wall under seat 51.

A baby seat 60 is mounted by a horizontal hinge pin 61 to the forward vetical wall 62 of basket 11 on the inside face of wall 62 with seat 60 fixed with stops to permit it to be folded into the vertical plane against wall 62 for storage purposes, or alternately to be folded into a horizontal plane as shown to serve as a seat for a baby.

Intermediate section 18 of platform 15 is located just above the floor level 69 on which wheels 16 and 17 ride so as to simplify the task of stepping on or off the cart 10 when shopping.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A motor driven shopping cart comprising a platform on which an open basket is located at the forward section of the platform and a seat is mounted on the rear section of the platform, with the forward and rear ends of the platform elevated in stepped fashion to accommodate a pair of front wheels mounted under the front platform end and a pair of rear wheels mounted under the rear platform end, with a first pair of said wheels linked to a motor mounted on the platform for rotating said wheels and the second pair of wheels linked to a steering mechanism for steering said wheels, in which an open space is provided above the platform between the basket and the seat for positioning of the legs of a person seated on the seat facing the basket, with a pair of pivotably mounted foot pedals mounted on the platform, in which a first of said foot pedals is linked to the control circuit of the motor, and the second of said foot pedals is linked to the steering mechanism of the wheels, each said foot pedal pivotally mounted by an individual hinge pin to the platform to be pivotable in a vertical plane, along the longitudinal axis of the shopping cart.

* * * * *